May 29, 1928.
J. D. R. FREED
1,671,959
MEANS FOR ELIMINATING REACTIVE COUPLING IN RADIO CIRCUITS
Filed July 19, 1924
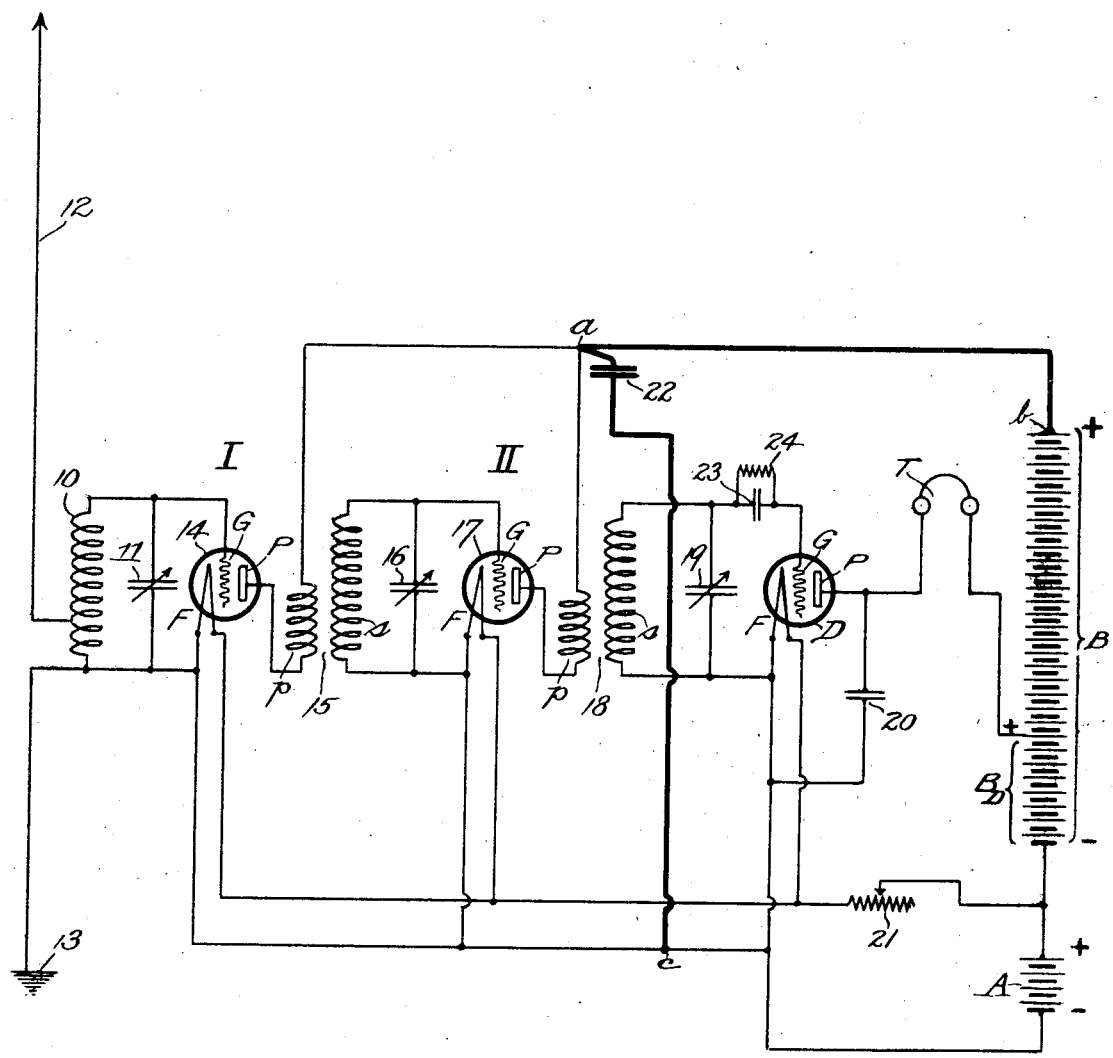
INVENTOR
Joseph David Roth Freed
BY
ATTORNEYS Patented May 29, 1928.

1,671,959

UNITED STATES PATENT OFFICE.

JOSEPH DAVID ROTH FREED, OF WOODMERE, NEW YORK, ASSIGNOR TO FREED-EISEMANN RADIO CORPORATION, OF BROOKLYN, NEW YORK, A CORPORATION OF NEW YORK.

MEANS FOR ELIMINATING REACTIVE COUPLING IN RADIOCIRCUITS.

Application filed July 19, 1924. Serial No. 726,996.

It is well known that in tuned multi-stage radio frequency amplifiers it is essential to eliminate all couplings between successive stages. This coupling may be either magnetic, capacitative, or reactive, or it may be due to all three kinds of coupling.

The magnetic coupling, as is known, can be eliminated for instance by placing the inductance coils contained in the several circuits in proper geometrical relation to each other to prevent linkage by stray flux.

The capacitative coupling, such for instance as may be due to the internal capacities of the thermionic tubes employed in the circuit, can be avoided, as is also known, by properly neutralizing or balancing these capacitative effects so that capacitative coupling between stages is avoided.

A reactive coupling commonly occurs in these circuits due to the fact that the different stages of the amplifier circuit have certain leads in common. Since high frequency currents flow in some of these common leads, and since these leads have a certain amount of inductance, reactance voltages are set up therein. The effect of these voltages is that for instance the reactance voltage set up by the current flowing in one stage, would affect the current which tends to flow normally from the other stage through the same conductor, thereby modulating it unduly and bringing about an undesired coupling between the two stages.

Such reactive coupling arises particularly in the unavoidable leads between the amplifier circuits and the batteries, which for practical reasons are usually common to all stages. Since these leads are of appreciable length, they have an appreciable inductance, which may represent a considerable reactance at high frequencies, and thus bring about a substantial coupling between the several radio frequency stages. This coupling may be sufficient to produce undesired oscillations, notwithstanding the fact that all other coupling may have been eliminated by suitable provisions known in the art.

The accompanying drawing is a diagram of circuits embodying the invention.

In said drawing I have illustrated, by way of example, a two stage radio frequency amplifier and detector circuit embodying means for eliminating the reactive coupling occurring in common leads. In this diagram, the two radio frequency stages are shown at I and II. Stage I comprises an oscillatory circuit including an inductance coil 10 and a variable condenser 11, the inductance coil being coupled with a receiving antenna 12. The lower end of coil 10 is grounded as shown at 13. Oscillatory circuit 10, 11 is connected to the grid G and filament F of the thermionic tube 14. The output side of tube 14, including the plate P and the filament F, is connected to the battery B by way of the primary coil $p$ of a radio frequency transformer 15. The secondary $s$ of transformer 15 and variable condenser 16 constitute an oscillatory circuit connected to the input side G, F of the second stage thermionic tube 17. The output side, comprising the plate P and filament F of tube 17, is connected in circuit with the primary $p$ of another radio frequency transformer 18, likewise by way of battery B. The secondary $s$ of transformer 18 constitutes with variable condenser 19 an oscillatory circuit connected to the grid G and filament F of detector tube D, whose plate P and filament F are in circuit with the indicating device such as for instance telephone T and a detector plate battery $B_p$. A by-pass condenser 20 is provided between the plate and filament of the detector tube in conventional manner. The customary grid condenser is shown at 23, shunted by a grid leak 24. The filaments F of all three tubes are heated by current from the common battery A, under control of a rheostat 21.

In such circuits using a common plate battery B for two or more radio frequency stages, the use of a common lead between the respective primary coils $p$ of the radio frequency transformers and the return to the respective filaments of these tubes is usually preferred. In particular, it is most convenient to use a common lead between these primary coils and the positive pole of the B battery. This common lead includes the portion $a, b$ of the circuit and is indicated by a heavy line. Usually in receiving sets mounted in cabinets the point $a$ constitutes the plus B battery binding post, and the line $a, b$ constitutes the lead from the binding post to the battery. This lead may have a length from two to six feet or more according to the distance which the B battery is placed from the set.

In the practical construction of such receivers I have found that the reactive inductance involved in the unavoidable length of this lead constitutes an appreciable source for coupling between the first and second radio frequency stages, sufficient to set up undesired oscillations between the two stages irrespective of the fact that for instance the inductance coil 10 and the radio frequency transformers 15 and 18 may be suitably placed relatively to each other to avoid magnetic coupling between adjacent stages, and irrespective of the fact that the inner capacity of the thermionic tubes 14 and 17 (grid-plate capacities) may be duly neutralized, and irrespective of the fact that the tuning condensers 11, 16 and 19 may be duly shielded from each other, as by grounded shields (not shown).

In order to clearly indicate the appreciable values of the constants involved in using the common lead $a, b$, let us assume the inductance L of lead $a, b = 20$ micro henrys, which is a practical value for a broadcast receiving set. Assume further a wave length of 300 meters so that the frequency $f = 1,000,000$ cycles/sec.

The reactance $X_L$ in ohms amounting to $\omega L = (2\pi f) L$, one would obtain at the assumed frequency of 1,000,000 cycles $X_L = 2 \times 3.14 \times 10^6 \times 20 \times 10^{-6}$. Thus the inductive reactance $X_L = 125.6$ ohms. With the radio frequency current $i$ flowing through lead $a, b$ from one stage at a given moment, we have a reactance voltage $E_L = \omega L i$. Thus an appreciable reactance voltage $E_L$ would be developed at the reactance $X_L$ of 125.6 ohms, sufficient to affect and modulate (as it were) the radio frequency current $i$ tending to flow at the same moment from the other stage through lead $a, b$. This change in current, being produced in the primary circuit of the transformer, impresses a corresponding voltage change in the secondary and hence upon the grid of the second tube, where it causes an amplified current change in the output circuit which again reacts in the manner described and may ultimately establish self-oscillation of the system.

According to my invention I propose to ground point $a$ by means of a condenser of suitable size to reduce the value of the current change occurring in the common lead below that necessary to enable self-oscillation of the system in the manner described. I have shown in the diagram a condenser 22 connected with a very short lead to the point $a$ at which the two output circuits of stages I and II join, the other electrode of condenser 22 being connected to ground, by connecting it at the point $c$ to one of the filament leads which in turn is connected to ground 13 as shown. This ground lead from 22 to $c$, while shown quite long in the diagram for the sake of clearness, is in reality also very short in actual practice, since point $a$ can easily be brought so close to point $c$, that in fact no leads at all are used, the condenser terminals being directly soldered to points $a$ and $c$.

I find in actual practice the value of condenser 22 must usually be much greater than that with which those skilled in the art are accustomed to by-pass radio frequency currents in other parts of radio receiver circuits. A capacity of 1.mf. has been found necessary in many receivers embodying the circuit shown in the drawing. If we assume in the example given above the value of 1.mf. for condenser 22 we would obtain its capacitative reactance $$X_c = \frac{1}{\omega C} = \frac{1}{2\pi f C} =$$
$$\frac{1}{2 \times 3.14 \times 10^6 \times 10^{-6}} = \frac{1}{6.28} = 0.159$$

ohms (in round figures).

It will be readily understood that such a low impedance path will practically eliminate the occurrence of sufficient reactance voltage to produce any substantial coupling between those stages which have a lead in common. The greater the value of condenser 22, the less tendency exists for a reactive voltage $E_L$ to develop. The value of condenser 22 is not critical but I have found 1.mf., as assumed above, sufficient for the kind of circuits represented in the example. The larger it is, the less will be the coupling effect between the two stages, but it is only necessary to reduce this coupling effect to a point where the inherent circuit losses will prevent the development of self-oscillation.

I claim:—

1. A radio circuit comprising a plurality of radio frequency amplifier stages having thermionic tubes arranged in cascade with a portion of their output circuits in common, and a condenser shunting substantially all of the common portion of their output circuits and of sufficient capacity to keep the reactance voltage, tending to occur in the common portions of the output circuits, below the value at which it may cause self-oscillation.

2. In a multi-stage radio frequency amplifier circuit a plurality of thermionic amplifier tubes each having a filament, a grid and a plate, each tube having its output side coupled with the input side of the succeeding tube, the filaments of all of said tubes having a common, grounded filament lead, a source of direct current connected into the output circuits of all of said amplifier tubes and having a lead in common with all of said output circuits, and a condenser connected between the junction point of said lead with said output circuits and said grounded filament lead, to shunt the reactance voltage tending to develop in said common output circuit lead.

JOSEPH DAVID ROTH FREED.